United States Patent
Graf et al.

(10) Patent No.: US 9,547,162 B2
(45) Date of Patent: Jan. 17, 2017

(54) INTERACTIVE PROJECTION SYSTEM

(71) Applicant: THE REGENTS OF THE UNIVERSITY OF MICHIGAN, Ann Arbor, MI (US)

(72) Inventors: Roland Graf, Ann Arbor, MI (US); Surat Kwanmuang, Bangkok (TH)

(73) Assignee: The Regents Of The University Of Michigan, Ann Arbor, MI (US)

( * ) Notice: Subject to any disclaimer, the term of this patent is extended or adjusted under 35 U.S.C. 154(b) by 0 days.

(21) Appl. No.: 15/052,950

(22) Filed: Feb. 25, 2016

(65) Prior Publication Data

US 2016/0246039 A1 Aug. 25, 2016

Related U.S. Application Data

(60) Provisional application No. 62/120,541, filed on Feb. 25, 2015.

(51) Int. Cl.
| | |
|---|---|
| *A63G 31/00* | (2006.01) |
| *G02B 19/00* | (2006.01) |
| *G02B 26/08* | (2006.01) |
| *F21S 9/03* | (2006.01) |
| *G09F 19/18* | (2006.01) |
| *G02B 26/00* | (2006.01) |

(52) U.S. Cl.
CPC .......... *G02B 19/0042* (2013.01); *F21S 9/035* (2013.01); *G02B 26/0816* (2013.01); *G09F 19/18* (2013.01)

(58) Field of Classification Search
CPC ......... A63G 31/00; G02B 5/00; G02B 6/0065; G02B 21/00; G02B 21/56; G02B 27/2292; G02B 27/2235; G02B 17/061

USPC .... 472/59, 61, 130; 353/73, 74, 79–80, 120, 353/121; 359/443, 449, 459
See application file for complete search history.

(56) References Cited

U.S. PATENT DOCUMENTS

| | | | |
|---|---|---|---|
| 3,173,985 A * | 3/1965 | Wendel | G02B 5/08 353/121 |
| 5,407,391 A * | 4/1995 | Monroe | G02B 6/0065 472/61 |
| 6,364,315 B1 | 4/2002 | Velke, III | |

(Continued)

OTHER PUBLICATIONS

Official Journal of the American Academy of Pediatrics, vol. 129, No. 3, pp. e636-e642, Mar. 2012, "Impact of an Active Video Game on Healthy Children's Physical Activity," Tom Baranowski et al.

(Continued)

*Primary Examiner* — Kien Nguyen
(74) *Attorney, Agent, or Firm* — Harness, Dickey & Pierce, PLC

(57) ABSTRACT

An interactive projection system for outputting illuminated indicia upon a projection surface. A detection system is operable to detect both stationary and movable features. A control system is operable to determine the position of the stationary and movable features. A reflective device reflects light from a light source (natural and/or artificial) upon the projection surface as the illuminated indicia. A drive system moves the reflective device, thereby moving the illuminated indicia across the projection surface in response to control system thereby simulating the stationary feature on the projection surface as a physical boundary to the illuminated indicia and simulating the movable feature contacting the illuminated indicia.

14 Claims, 3 Drawing Sheets

(56) References Cited

U.S. PATENT DOCUMENTS

| | | | |
|---|---|---|---|
| 6,428,169 B1 * | 8/2002 | Deter | G03B 21/56 353/20 |
| 6,912,074 B1 * | 6/2005 | Son | G02B 5/0252 359/28 |
| 7,252,394 B1 | 8/2007 | Fu | |
| 7,416,306 B2 | 8/2008 | Yamamoto et al. | |
| 2012/0315819 A1 | 12/2012 | Gandy | |

OTHER PUBLICATIONS

PLoS ONE, vol. 8, No. 6, e65351, Jun. 2013, "Active Video Games and Health Indicators in Children and Youth: A Systematic Review," Allana G. LeBlanc et al.

The New York Times, Business Day, Jun. 23, 2012, "'Exergames' Don't Cure Young Couch Potatoes," Randall Stross.

* cited by examiner

INTERACTIVE PROJECTION SYSTEM

CROSS-REFERENCE TO RELATED APPLICATIONS

This application claims the benefit of U.S. Provisional Application No. 62/120,541, filed on Feb. 25, 2015. The entire disclosure of the above application is incorporated herein by reference.

FIELD

The present disclosure relates to an interactive projection system and, more particularly, relates to an interactive projection system employing sunlight and/or artificial light to produce static and/or dynamic images on indoor or outdoor surfaces that can be controlled by body and shadow movement, without the use of separate input devices or wearables.

BACKGROUND AND SUMMARY

This section provides background information related to the present disclosure which is not necessarily prior art. This section provides a general summary of the disclosure, and is not a comprehensive disclosure of its full scope or all of its features.

Generally, interactive games or interfaces are limited to use on TV, computer screens, or conventional (digital video projections) and perform best in dimmed light conditions of a living room. To date, daylight or direct sunlight has not yet been consequently explored for the use in display or entertainment systems. In most video game applications, for example, direct sunlight interferes with, rather than supports, video displays and (motion-sensing) systems. On one hand, this latent incompatibility of sunlight with the performance of interactive media systems promotes an indoor media culture. As a result, physical outdoor activities often conflict with video gaming activities. On the other hand, people who do want to use interactive media systems in outdoor environments, for example to play video games (e.g. location based street games) rely on small displays of mobile devices and/or wearable technology with which they often "screen" the physical environment out rather than to fully engage with it.

Accordingly, there exists a need to provide an interactive media experience that is not limited to indoor applications. Moreover, there exists a need to provide an interactive media experience that can naturally co-exist and augment the physical environment in which it is used to create an immersive location-based (or site-specific) interactive experience that is encumbered by any wearable technology. Furthermore, there exists a need to provide an interactive media experience that is capable of employing natural sunlight as the operable light source for the media experience. Still further, there exists a need to provide an interactive media experience that can be used in both sunlight and artificial light applications.

In accordance with the principles of the present teachings, an interactive projection system for outputting illuminated indicia upon a projection surface is provided having advantageous construction and method of use. A detection system is provided that is operable to detect both stationary and movable features. A control system is operable to determine the position of the stationary and movable features from sensors such as, but not limited to, imaging sensors and the position of the light source. A reflective device reflects light from a light source (natural and/or artificial) upon the projection surface as the illuminated indicia. A drive system moves the reflective device, thereby moving the illuminated indicia across the projection surface in response to control system thereby simulating the stationary feature on the projection surface as a physical boundary to the illuminated indicia and simulating the movable feature contacting the illuminated indicia.

In some embodiments of the present teachings, an interactive projection system is provided which enables one or more players to play a full body game, in which one or several moving sunlight reflections (or focused video or laser projections) serve as the target and the street or other outdoor/indoor surface serves as the screen. Through motion sensing technology, players, such as pedestrians or animals, can interact with the projected target as physical beings unencumbered by screens or controllers. The player can "contact" the projected target with their hands, feet, or the associated shadow cast by their body or limb. In some embodiments, the players can play with each other by bouncing it off the hands, feet, or associated shadow, and/or by bouncing it off either naturally occurring physical structures (curbs, road markings, or other delineations) or predefined artificial boundaries. In some embodiments, the interactive projection system is self-powered, such as via solar energy. In the case of solar-powered installation, the control system is also operable to determine the amount of power generation, consumption and storage, thus adjust operation time accordingly.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
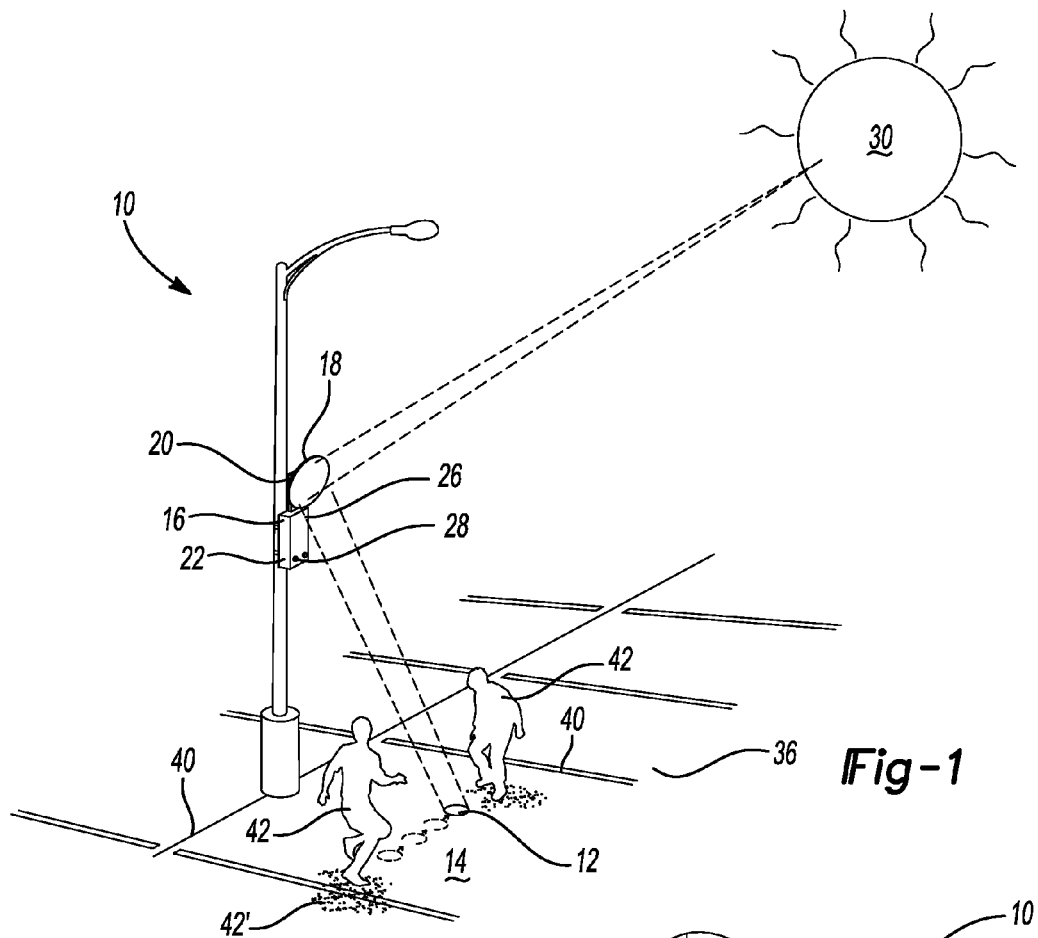
FIG. 1 is a schematic view of an interactive projection system according to some embodiments of the present teachings.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

According to the principles of the present teachings, as illustrated in FIGS. 1-4, an interactive projection system 10 is provided for outputting one or more illuminated indicia 12 upon a projection surface 14 that can be used in both indoor and outdoor applications. The projection surface can be in any orientations such as horizontal or vertical plane.

It should be understood that interactive projection system 10 may be useful in a wide variety of applications, such as, but not limited to, artistic/aesthetic lighting and display, advertising or information display, interactive outdoor video games (e.g. street video games), physical therapy, sports and recreation, animal entertainment, and the like. Accordingly, in some embodiments, advantages exist including, but not limited to, being completely solar-powered and providing high-intensity daytime displays.

In some embodiments, illuminated indicia 12 can comprise a pong-like member 12', being generally circular and projected upon projection surface 14. However, it should be understood that illuminated indicia 12 can comprise any one of a number of static or dynamic changing depicted shapes or video images, including, but not limited to, geometric shapes (e.g. circular, oblong, elongated, square, rectangular, and the like), animal shapes (e.g. dog, cat, mouse, bird, and the like), sports-related shapes (e.g. football, basketball, tennis ball, and the like), logo or other advertising shapes, or other aesthetic illuminations.

Figure 2:
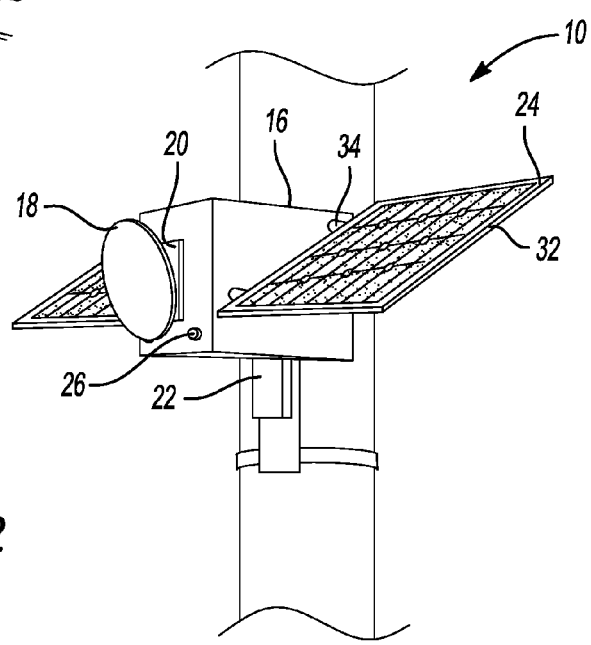
FIG. 2 is a perspective view of an interactive projection system employing solar energy according to some embodiments.
Figure 3:
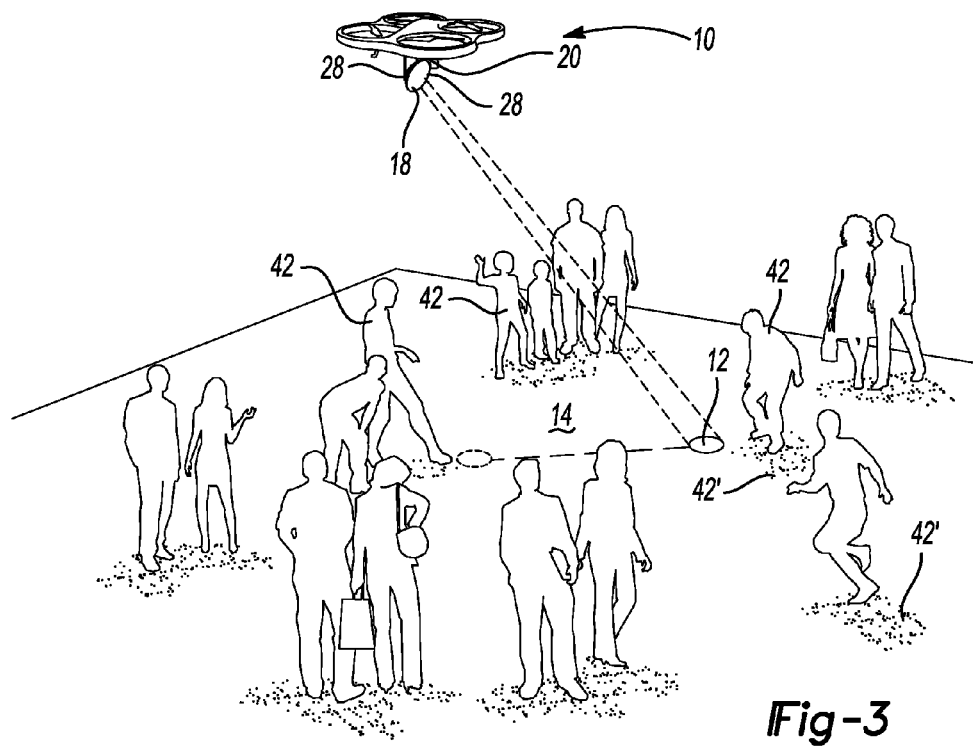
FIG. 3 is a perspective view of an interactive projection system employing a drone according to some embodiments.
Figure 4:
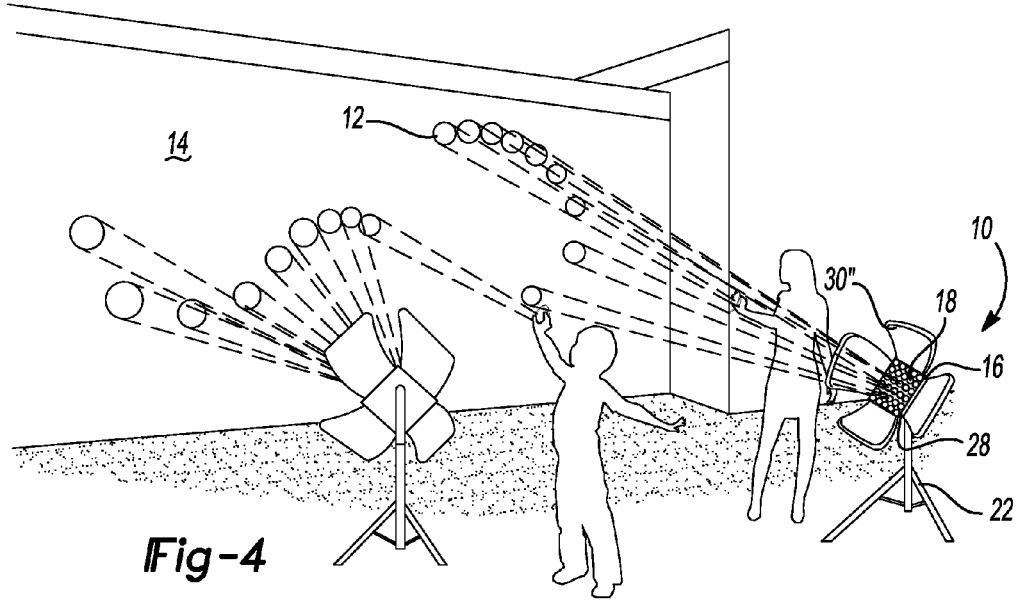
FIG. 4 is a perspective view of an interactive projection system employing a portable structure according to some embodiments.

With particular reference to FIGS. 1-3, in some embodiments, interactive projection system 10 can comprise a housing 16, one or more reflective devices 18, one or more reflective device drive systems 20, a mounting system 22, a power system 24, a detection system 26, and a control system 28.

In some embodiments, housing 16 can comprise a structure sufficient for containing and/or protecting one or more of reflective device 18, reflective device drive system 20, power system 24, detection system 26, and control system 28. Housing 16 can be made of any suitable material capable of withstanding environmental effects, such as metal, plastic, and the like.

Figure 5A:
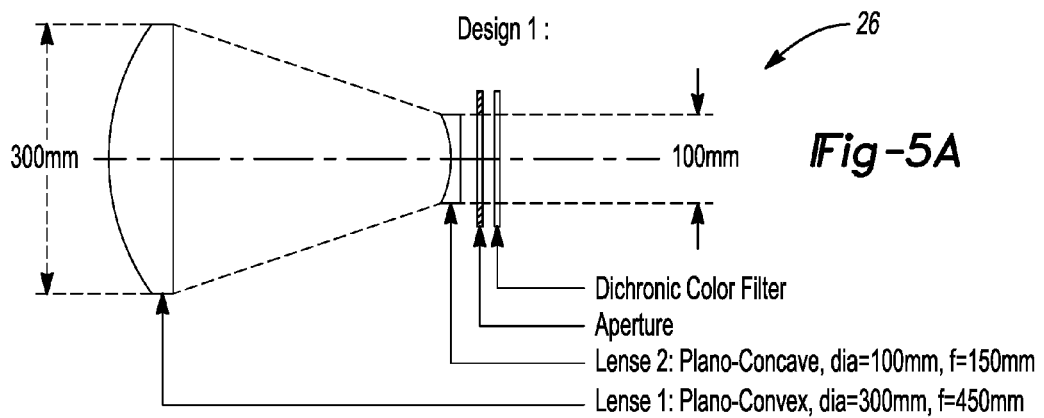
FIGS. 5A-5C illustrate a plurality of possible additional lens element arrangements when using sunlight in connection with a detection system.
Figure 5B:
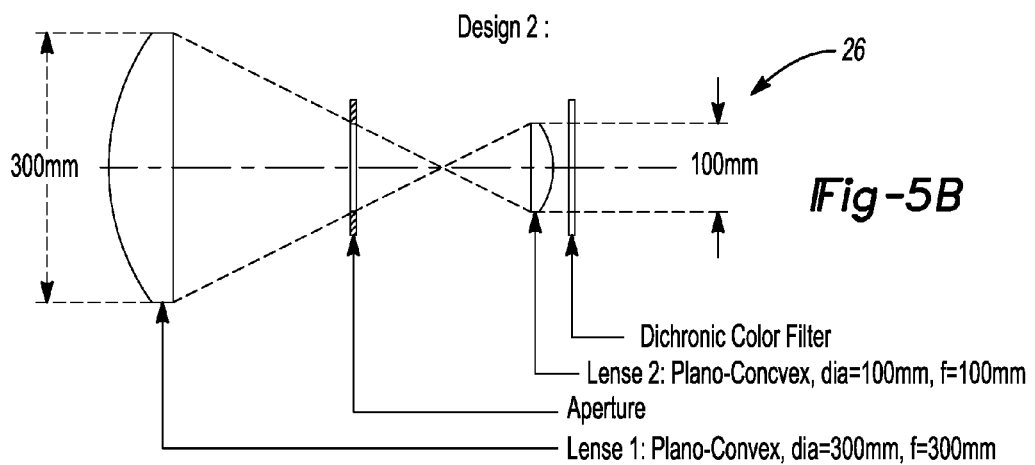
Figure 5C:
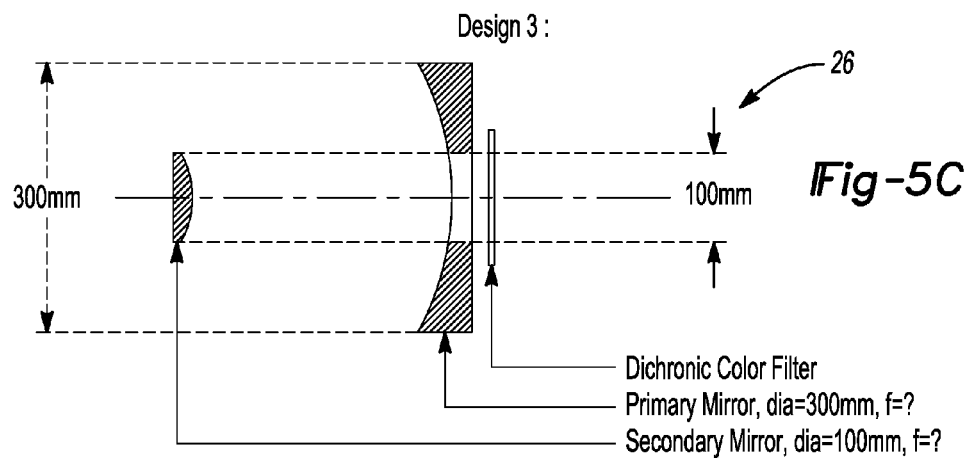

In some embodiments, reflective device 18 is supported by reflective device drive system 20 and is movable in every orientation in response thereto. Reflective device 18 is configured to reflect at least a portion of light from a light source 30 to projection surface 14. To this end, in some embodiments, reflective device 18 can comprise a mirror, such as a dichroic mirror, for reflecting light source 30 to define illuminated indicia 12. In this way, reflective device 18 can further collect, condense, collimate, focus, and/or filter light from light source 30 to project or display indicia 12 via one or more lens or mirror elements (see FIGS. 5A-5C)) or other forms of sunlight concentration methods such as LSC (luminescent solar concentrator). Moreover, any light manipulation technology such as, but not limited to, go between optics (GOBOs), filters, dichroic mirrors, films, and LCD panels, DLP devices can be used to further manipulate the illuminated indicia 12.

In some embodiments, light source 30 is a natural light source 30' (e.g sun), thereby providing a naturally-occurring light and power source (as will be discussed herein). It should be appreciated that the sun's rays reach the Earth's atmosphere at intensity of over 1,000 W/m$^2$. Conventional power systems range from 0.75 watts for personal laser pointers to about 10's of watts for laser light show systems to about 100's of watts for projectors. Therefore, harnessing the sun's power results in an outdoor projection system capable of displaying advertising, information, aesthetic accents, or even video games with sufficient intensity to be easily seen even on bright days at practically zero power cost.

In some embodiments, however, light source 30 can comprise an artificial light source 30", such as incandescent, halogen, LED, fluorescent, laser, and other conventional illumination sources. Further, the light source can comprise a laser projector or a video projector—the latter in combination with a narrow beam angle projection lens system to achieve high luminosity output. To permit use of interactive projection system 10 in both natural light and artificial light applications, in some embodiments, interactive projection system 10 can comprise both natural light source 30' and artificial light source 30" in a hybrid illumination system. In this way, control system 28 can be used to actuate or otherwise operate artificial light source 30" when natural light source 30' is unavailable, which may result due to time of day or obstruction of the source (e.g. cloudy day, indoors, and the like). Further, additional artificial light sources can be used to create shadows if sunlight is not available.

In some embodiments, reflective device drive system 20 can comprise a mechanical apparatus operably connected between reflective device 18 and at least one of housing 16 and mounting system 22. Reflective device drive system 20 can comprise one or more servomotors, stepper motors, brushless motors, pneumatic or hydraulic actuators that control the motion of reflective device 18 through a direct-connection or through a mechanism such as four-bar linkages, belts, chains that is protected from the harsh environment. In this way, reflective device drive system 20 can actuate reflective device 18 to 1) position reflective device 18 in a proper orientation to reflect light from light source 30 to projection surface 14 and 2) to animate illuminated indicia 12 upon projection surface 14 (e.g. to depict movement of illuminated indicia 12 across projection surface 14 and/or to vary a depicted shape of illuminated indicia 12).

With reference to FIG. 2, in some embodiments, mounting system 22 of interactive projection system 10 is used to mount housing 16 and the associated structure of interactive projection system 10 upon a mounting surface, such as poles, trees, buildings, or other suitable structure. It should be appreciated that mounting system 22 can define any shape suitable for mounting upon the selected mounting surface. Furthermore, it should be appreciated that mounting system 22 can comprise a portable structure, such as a stand (see FIG. 4), to permit temporary support of interactive projection system 10. Still further, mounting system 22 can comprise a movable platform, such as an aircraft, drone, pulley, line, or the like (see FIG. 3).

Power consuming systems of interactive projection system 10 can be electrically powered by power system 24. Although power system 24 can be a conventional power system using supplied alternating current (AC), or direct current (DC), in some embodiments, power system 24 comprises one or more solar panels 32 operably coupled to housing 16 and electrically coupled to a power distribution system (not shown) for powering reflective device drive system 20, detection system 26, control system 28, and power storage system. In this way, interactive projection system 10 provides a self-contained assembly that is electrically independent from a local power grid, thereby permitting interactive projection system 10 to be portable and/or installed in locations without requiring connected electrical power.

In this way, power system 24 can further comprise a powered positioning system 34 operably positioning solar panels 32, housing 16, and/or reflective device 18 for optimal operation. That is, powered positioning system 34, such as a geared stepper motor, servomotors, brushless motors, pneumatic or hydraulic actuators can operably actuate solar panels 32 to maximize solar efficiency and can operably actuated reflective device drive system 20 to maximize the reflective capability of reflective device 18 when illuminating indicia 12. A GPS module can be used with the control system to determine the current location and time to properly position solar panels 32, housing 16, and/or reflective device 18 in correct alignment with the sun.

As illustrated in FIGS. 1-4, detection system 26 of interactive projection system 10 can comprise one or more sensors and/or cameras operable to monitor one or several projection surfaces 14. Detection system 26 can detect both stationary and moving objects within a predetermined area. Although, in some embodiments, the detection system 26 only detects objects within the corresponding area defined by the projection surface 14, it should be understood that the detection system 26 can detect objects within a larger or smaller predetermined area, such as a field-of-play area 36 in game-playing scenarios. In this way, detection system 26 can be constrained to only detect objects within the projection surface 14 (that is, the field-of-play area 36 being equal to or smaller than the projection surface 14) or can be permitted to detect objects outside the projection surface 14 (that is, the field-of-play area 36 is larger than the projection surface 14).

In some embodiments, detection system 26 can be configured to be operational in bright sunlight applications, which often prove difficult for many motion tracking systems. For instance, during preliminary tests it was determined that the Microsoft Kinect sensor, which is often used for full body gaming, does not perform well in bright daylight. Accordingly, it has been found that a color camera, such as a Point Grey color camera with wide-angle lens, is particularly useful for detecting both stationary and moving objects in the predetermined area.

Detection system 26 can be configured to detect stationary objects and/or features 40 within the predetermined area. The stationary features can be both physical, such as curbs, walls, lines, or other transitional features found in the natural environment, or non-physical, such as artificially defined boundaries or borders. These stationary features, both those that are physically occurring and those that are non-physical but arbitrarily applied to the physical world, can serve as defined boundaries for display of indicia 12. In the embodiments, such as during a pong-like game play, indicia 12 can be moved about the field-of-play 36 and can "strike" these stationary objects, thereby reversing course or "bouncing" there off. By using at least some of the aforementioned transitional features that naturally occur in the environment, interactive projection system 10 can appear to be aware of and/or respond to the natural environment.

Likewise, detection system 26 can be configured to detect movable objects 42 within the predetermined area. The movable objects can include the physical shape of players, humans, and animals. Moreover, detection system 26 can detect the associate shadow cast by movable objects 42', such as the shadow of a hand, foot, head, body, arm, leg, or other feature. Likewise, the system can be programed to detect additional moving sunlight reflections or laser or light points as targets in the playfield. The detection system also converts detections in the camera reference frame to the reference frame of the projection surfaces 14. It should be recognized that detection system 26 is capable of detecting and tracking a plurality of stationary and movable objects, thereby permitting players, humans, and animals to each have an effect on indicia 12 during use.

Control system 28 can comprise a central processing unit receiving input signals from detection system 28 and outputting signals to one or more of reflective device drive system 20, power system 24, and a detection system 26. In some embodiments, control system 28 can comprise a computational device such as laptop computer or computing module with wired or wireless communications system operably coupled to control system 28 to permit user access, via a public web interface, Bluetooth, Wi-Fi, cellular, or other protocol, to monitor status and/or watch live gameplay over the Internet. In some embodiments, control system 28 can comprise a computer vision module in the form of software running on the computational device or a separate hardware module to process the video stream from detection system 26 to distinguish players and their shadows from the background. Together with the position estimation of the light source position from the control system, a pong-like game program can output the desired reaction position to reflective device drive system 20 to actuate the positioning of reflective device 18 (thereby animating indicia 12).

In some embodiments, interactive projection system 12 can comprise an audio system for outputting audio (e.g. additional audio feedback such as a "Pong" sound, an annunciation for the system status, public announcement or an advertisement message). In some embodiments, interactive projection system 12 can comprise a plurality of reflective devices 18 to permit a plurality of indicia 12 to be illuminated simultaneously.

Gaming Applications

Humans are physical beings that are adapted to exist naturally in the outdoors. However, many of the popular video games of today require indoor use. However, the interactive projection system of the present teachings can transform a street in bright daylight into an interactive immersive environment.

In this environment, pedestrians can play video games as physical beings unencumbered by screens or controller. Free from input devices and exposed to sunlight, players find both their bodies and shadows present in the game. In some embodiments, of interactive projection system turns a simple sunlight reflection on the ground into the target of a pong-style or hockey-style street game that can be played with the whole body. That is, in some embodiments, interactive projection system 10 builds on the simple screen-based game mechanics of Pong, but enables players 42 to use a more natural interaction behavior similar to playing with a real ball. In fact, it is designed to offer an immersive and location-based gameplay experience in bright daylight without the use of any wearable sensor or head mounted display technologies.

In some embodiments, an illuminated pink circle 12, generated by sunlight and/or artificial light, moves at a constant speed of 2.5 m/s on the ground 14 and appears to react and/or respond to the natural environment. That is, it bounces back from play field boundaries 40 or anything that the detection system 26 detects as body contours or shadows 42, 42' on the ground 14, thereby mimicking natural reflection of a ball or other object impacting a player or surface. For example, during play, players 42 can kick the spot with their feet or hit it with the shadows of their hands. They can volley it back and forth with a partner 42 or bounce it off a boundary 40, such as a curb or road marking. The shadow play of the game tends to be one of the preferred ways of interaction with the spot 12. However, the space in which these interactions occur goes far beyond a conventional screen. It should be understood that the speed of circle 12 can be dependent on the magnitude of the "contact force"—that is, how "hard" a player strikes the circle 12. Moreover, the speed of circle 12 can be dependent on other perceived physical properties, such as friction, weight, resistance, and other motion dynamics and characteristics of bodies in motion.

It should be appreciated that the custom designed dichroic mirror 18 makes the sunlight almost magically appear as a colorful spot 12 on the street like an animated pixel on a screen. Unlike the steady light of a screen or video projector, however, it is the ephemeral nature of daylight that forms the basis of this street video game and blurs the boundaries between interactive media and daylight as a medium.

It has been found that players positively respond to play field boundaries being matched to the natural boundaries of the game location (i.e. walls, curbs, road markings, etc.). This enhances the immersive and location based character of the game. Further, it has been found that increasing the speed and precision of the spot can make the game both more challenging and fun to play.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An interactive projection system for outputting illuminated indicia upon a projection surface, the projection surface having a stationary feature and a movable feature, the stationary feature defining a perceived spatial limit inhibiting movement of the indicia across the projection surface, the movable feature defining a perceived engaging member contacting the indicia, the interactive projection system comprising:
    a detection system directed toward at least a portion of the projection surface, the detection system outputting a detection signal in response to the stationary feature and movable feature;
    a control system operable to receive the detection signal and determine a position of the stationary feature and the movable feature, said control system determining a boundary of the projection surface based on the determined position of the stationary feature and the movable feature and outputting a projection control signal in response to the determined boundary,
    a reflective device reflecting light from a light source upon the projection surface as the illuminated indicia; and
    a reflective device drive system coupled to the reflective device, said reflective device drive system is configured to move the reflective device thereby moving the illuminated indicia across the projection surface in response to the projection control signal thereby simulating the stationary feature on the projection surface as a physical boundary to the illuminated indicia and simulating the movable feature contacting the illuminated indicia.

2. The interactive projection system according to claim 1, wherein the detection system comprises one or more detection sensors operable to detect a stationary physical feature on the projection surface.

3. The interactive projection system according to claim 2 wherein the stationary physical feature is chosen from the group consisting essentially of a curb, a wall, a physical delineation.

4. The interactive projection system according to claim 1, wherein the detection system comprises one or more detection sensors operable to detect a stationary non-physical feature on the projection surface.

5. The interactive projection system according to claim 4 wherein the stationary non-physical feature is an artificially-defined border.

6. The interactive projection system according to claim 1, wherein the detection system comprises one or more detection cameras operable to detect a movable shadow of a user.

7. The interactive projection system according to claim 1, further comprising:
    a power supply system electrically coupled with at least the control system, the detection system, and the reflective device drive system.

8. The interactive projection system according to claim 7 wherein the power supply system is a solar power supply system.

9. The interactive projection system according to claim 8, further comprising:
    a power positioning system coupled to the solar power supply system, the power positioning system is configured to move the solar power supply relative to the sun.

10. The interactive projection system according to claim 1 wherein the reflective device reflects light from the sun upon the projection surface as the illuminated indicia.

11. The interactive projection system according to claim 10 wherein the reflective device drive system is configured to move the reflective device relative to the sun.

12. The interactive projection system according to claim 1 wherein the light source is an artificial light source.

13. The interactive projection system according to claim 1 wherein the light source is chosen from the group consisting essentially of incandescent, halogen, LED, fluorescent, laser, and video or laser projector.

14. The interactive projection system according to claim 1 wherein the reflective device selectively reflects light from the sun and artificial light upon the projection surface as the illuminated indicia.

* * * * *